United States Patent [19]

Wertz

[11] 4,102,958

[45] Jul. 25, 1978

[54] METHOD OF CONTROLLING AN EXTRUDER

[75] Inventor: James B. Wertz, Setanket, N.Y.

[73] Assignee: Owens-Illinois, Inc., Toledo, Ohio

[21] Appl. No.: 643,426

[22] Filed: Dec. 22, 1975

Related U.S. Application Data

[63] Continuation of Ser. No. 466,489, May 2, 1974, abandoned.

[51] Int. Cl.$^2$ .................. B30B 15/14; B30B 15/20; B29F 3/00
[52] U.S. Cl. ........................... 264/40.6; 264/40.7; 264/176 R
[58] Field of Search ............. 425/144, 145, 149; 259/191; 264/40.6, 176 R

[56] References Cited

U.S. PATENT DOCUMENTS

| | | | |
|---|---|---|---|
| 3,526,926 | 9/1970 | Reid | 425/149 |
| 3,642,402 | 2/1972 | Hutchinson et al. | 264/328 |
| 3,698,844 | 10/1972 | Grimm | 264/40.6 |
| 3,721,512 | 3/1973 | Ma et al. | 264/40.6 |
| 3,728,056 | 4/1973 | Theysohn | 425/145 |
| 3,733,059 | 5/1973 | Pettit | 259/191 |
| 3,792,134 | 2/1974 | Paulson | 264/40.7 |
| 3,840,312 | 10/1974 | Paulson et al. | 425/145 |
| 3,924,840 | 12/1975 | Nelson | 259/191 |
| 3,937,776 | 2/1976 | Hold et al. | 264/40.6 |

FOREIGN PATENT DOCUMENTS

1,066,806  4/1967  United Kingdom ............ 425/144

*Primary Examiner*—Willard E. Hoag
*Attorney, Agent, or Firm*—Edward J. Holler; Steve M. McLary; David H. Wilson, Jr.

[57] ABSTRACT

An extruder apparatus control system wherein a temperature corresponding to that of the extrusion material is sensed at each of a series of zones extending along the apparatus extrusion chamber and also the velocity of the apparatus ram. The control system includes a command device for providing operating commands corresponding to a selected operating mode of the apparatus and a velocity command corresponding to a desired velocity of the ram for the selected operating mode. From these operating commands a controller establishes for a selected operating mode, a series of temperature set points, each corresponding to the desired temperature at one of the series of zones and from the velocity command, a velocity set point representing the desired velocity. Thereafter, the control system compares the set points with the sensed values and makes corrections as required to achieve and maintain an equality between them.

The control system allows the extruder apparatus to be changed from one operating mode to any other operating mode and also has provision for monitoring the temperature of the output extrusion material and if different from the desired values, the temperature set points are altered. Also, the pressure of the output extrusion material is monitored and, if necessary, the velocity of the ram is adjusted to maintain the pressure within safe limits. A further provision is made for sensing different malfunctions as they occur.

2 Claims, 5 Drawing Figures

METHOD OF CONTROLLING AN EXTRUDER

This is a continuation, of application Ser. No. 466,489, filed May, 2, 1974, now abandoned.

BACKGROUND OF THE INVENTION

This invention relates to a system for controlling extruder apparatus and particularly the operation thereof to achieve results in the desired operating fashion.

Typically, extruder apparatus has several operating modes such as run and halt. The ram velocity and the temperatures of the extrusion material at different zones along the extrusion chamber must always be considered whether changing operating modes or continuing in one operating mode. For example, if it is as desired to operate in the run mode after a long shut-down period, the extrusion material will be hard and unless heated to an appropriate forming temperature such that the extrusion material will be capable of being maneuvered by the extrusion ram, any attempted movement of the ram will result in serious damage to the apparatus. Hence, the operator must have considerable skill. Obviously, with this approach, if multiple apparatus are to be operated, each would require a separate operator. Also, the quality of the end product is very much influenced by the skill of the operator.

With the foregoing in mind, a new and different extruder apparatus control system is contemplated whereby the apparatus is operated automatically in each of several modes.

Also contemplated is an extruder apparatus control system that automatically changes the operating procedures for different mode changes.

Further contemplated is an automatically operating extruder apparatus control system that has a unique provision for monitoring malfunctions in the system.

Another objective is to provide an extruder apparatus control system that senses the condition of the output extrusion material and makes any required system changes.

A more specific object is to provide an extruder apparatus control system that senses the temperature of the output extrusion material and, if different than desired, alters the temperature profile of the material along the chamber.

Also an objection is to monitor the pressure of the output extrusion material and alter ram velocities accordingly.

The foregoing and other objects and advantages of the invention will become apparent from the following description and from the accompanying drawings in which:

Figure 1:
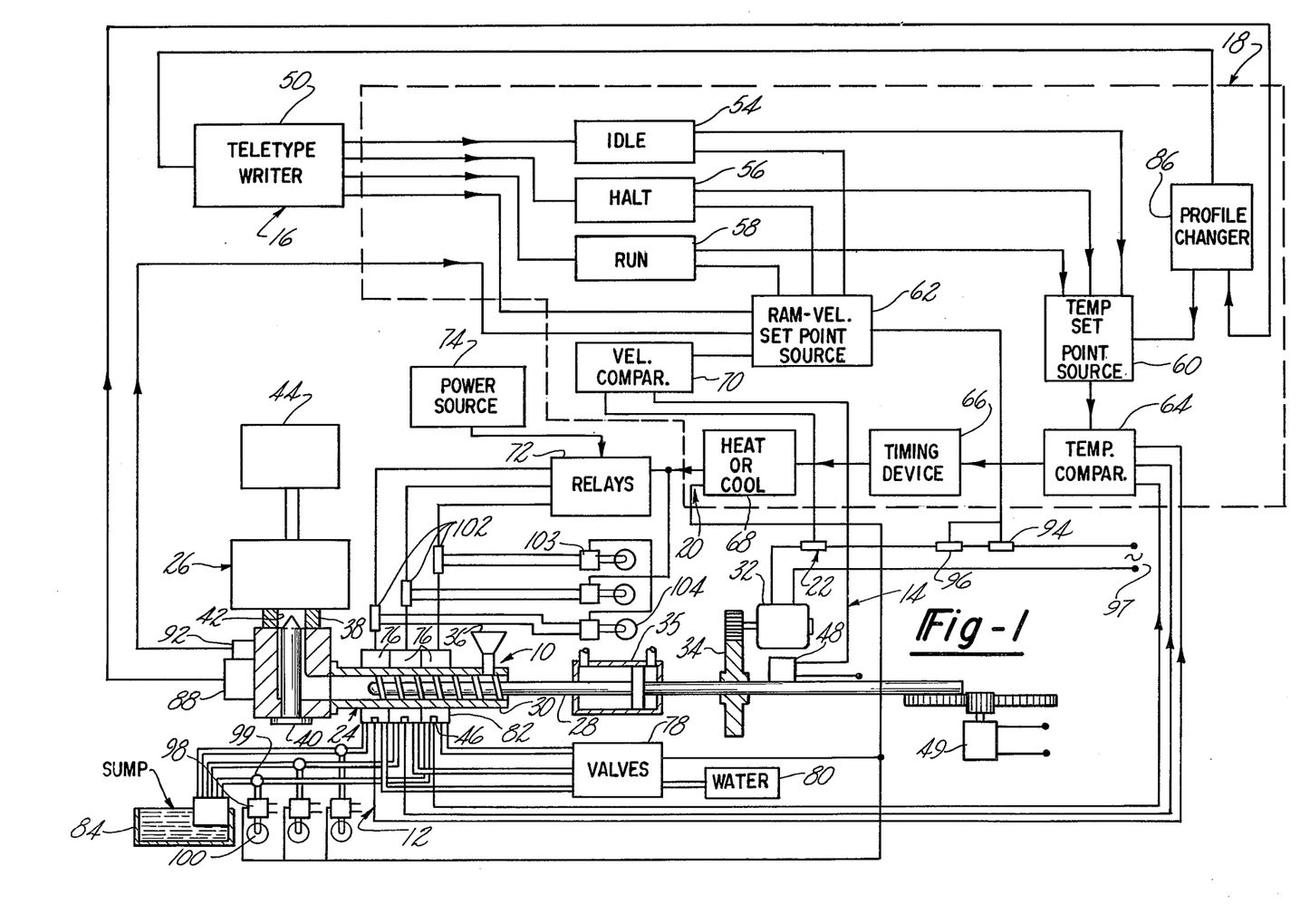
FIG. 1 is a schematic diagram of extruder apparatus and a control system incorporating the principles of the invention.

Referring first to FIG. 1, the numeral 10 denotes extruder apparatus of the type that, is a well-known way, extrudes extrusion material, which, for purposes of illustration only, may be a plastic-like material, such as polyvinyl chloride, hereinafter called PVC. The operation of the extruder apparatus 10 is monitored by a temperature sensor device 12 and a velocity sensor device 14. Each operating mode is established by a command device 16 which supplies commands in the form of command signals to a controller 18. The controller 18, in accordance with the command signals, establishes temperature and velocity set points for each selected mode of operation. These temperature and velocity set points are compared with the temperature and velocity signals developed by the temperature sensor device 12 and the velocity sensor device 14 to obtain temperature and velocity error signals which are utilized respectively by a temperature control 20 and a velocity control 22 to make the necessary corrections so that the apparatus 10 will operate at the desired or set point temperatures and velocities.

The extruder apparatus 10 includes an extruder 24 and a mold mechanism 26. The extruder 10 and the mold mechanism 26 may be of any well known kind, such as that described in the patents to Gasmire U.S. Pat. No. 3,012,286 and Heider et al U.S. Pat. No. 3,329,752. The extruder 24 includes an extruder ram 28 housed within an extruder chamber or barrel 30. The extruder ram 28 is rotated by an electrically operated drive motor 32 through a suitable change speed gear mechanism 34 and, if desired, may be moved axially by an appropriate motor, such as the depicted piston-type fluid actuated motor 35. A hopper 36 communicates with the extruder barrel 30 and contains the extrusion material in the usual pelletized or particulate form. At the outlet of the extruder is an annular orifice collar 38 which combines with an interior core 40 to define an extrusion chamber outlet in the form of a restricted annular extrusion orifice 42. As the extrusion material is forced through the orifice 42, the mold mechanism is moved away from or upwardly by a motor 44 to develop an object such as a blow molded container or a sheet of material (not shown).

When the extrusion material is PVC by way of example only, the extrusion process must be controlled very carefully, because PVC is a highly heat-sensitive material. If the PVC is held at too high a temperature for a certain period of time, PVC will degrade and will be extruded during the extrusion operation along with the good material making the manufactured product unacceptable. For the same reason, when shutting down the extruder apparatus 10, the PVC, because it degrades, must generally be purged by a less heat-sensitive material, such as polystyrene before stopping the extruder ram 28. Therefore, the melt temperature, which is the temperature of the extrusion material at the orifice 42, must be carefully monitored to obtain an acceptable manufactured product. Hence, the temperature sensor 12 has a series of zone temperature sensors, such as thermocouples 46 that are spaced along the extruder barrel 30. In the FIG. 1 embodiment, three zones are monitored, but more or less can be monitored, determined by the extent of control and the length of the barrel 30. These thermocouples 46 provide output temperature signals reflecting the temperature at each of the respective zones along the barrel 30 between the hopper 36 and the orifice 42. These temperature signals are then provided to the controller 18.

During operation, not only is it necessary to monitor and control the temperature profile, it is also necessary to control the speed of the ram 28, particularly when the extrusion material becomes unworkable, for damage to the apparatus can result. The velocity sensing device 14 utilizes for this purpose a tachometer generator 48 that develops an output velocity signal corresponding to the rotational speed of the ram 28. This velocity signal is then supplied to the controller 18. If wanted, the velocity control device 22 can include velocity sensor 49, which would develop a corresponding output signal representing the velocity of the rectilinear movements of the ram 28.

The operation of the extruder apparatus 10 in its various modes of operation can be mannually or automatically initiated by the command device 16 through the agency of a teletypewriter 50 or the like. In a well-known way, the teletypewriter will develop command signals for the selected mode and supply them to the controller 18.

After receiving the temperature and velocity signals and the command signals, the controller 18 serves a calculating function to develop control signals for operating the temperature control 20 so as to develop the desired temperature profile for the extrusion material. It should be noted that if a different velocity signal is commanded, the output extrusion material or the melt temperature will be affected and the temperature control 20 will make the corresponding adjustment. The controller 18 may be in various forms such as a digital computer or an analog computer and comprises a series of mode controls, including an idle mode control 54, a halt mode control 56 and a run mode control 58. Other mode controls, if required, may be included. These mode controls activate a temperature set point source 60 and a ram velocity set point source 62. These set point sources 60 and 62 are constructed so as to develop set point signals representing the desired temperatures and ram velocities.

Considering first the temperature set points, a sequence of three different temperature set points will be supplied by the temperature set point source 60 to a temperature comparator 64. This temperature comparator 64, which can be a conventional summing circuit, functions to compare the temperature signals corresponding to the actual temperature provided by the temperature sensor 12 at each of the three zones along the barrel 30 with the set point signals. Any difference results in the development of a temperature error signal that is then pulse-width or pulse-duration modulated by a timing device 66. The timing device 66 may be any suitable kind of pulse-width shaper. The pulse-width modulated signal then will activate a heat or cool device 68. By way of example and without limitation, if the error signal is negative, indicating that the sensed temperatures are below the desired temperatures, the heat or cool device 68 will provide a heat control signal to the temperature control 20. The temperature control 20 will be turned on and off for the time durations determined by the width of the control signal established by the timing device 66 and will provide heat determined by the average of the time duration of the on pulse to the total time of the on and off period. The opposite would occur if the error signal is positive, indicating that the sensed temperatures are higher than the set point. Then, the heat or cool device 68 will develop a cool control signal that would cause the temperature control to provide cooling for the time intervals determined by the timing device 66. The heat or cool device 68 may be any plural channel device and have one relay for heating and another relay for cooling for each zone along the barrel 30. The decision for either heating or cooling by device 66 may be biased for a constant amount of heating or cooling when the error signal is zero when either heating or cooling is required to maintain the desired temperature.

The ram velocity set point signals provided by the ram velocity set point source 62 are supplied to a velocity comparator 70, which may also be a summing circuit. The velocity comparator 70 will compare the ram velocity set point signals with the velocity signals derived from a velocity sensor 14 and develop a velocity error signal corresponding to the differences, if any. This velocity error signal is supplied to the velocity control 22. This velocity control 22 can be any suitable voltage divider which alters the voltage applied to the motor 32 so as to, in turn, alter the velocity of the ram 28 and thereby achieve the desired ram velocity.

As explained, the temperature control 20 functions to provide heating or cooling so that the desired temperature at each zone along the barrel 30 is achieved. The temperature control 20 includes a series of relays 72 which can be any known type of switch that will respond to the control signals developed by the controller 18. In operation, if a negative heat control signal is developed for one or more of the zones along the barrel 30, the appropriate relay or relays 72 will connect the power source 74 to the appropriate heater or heaters. The total number of heaters 76 will correspond in number to the number of zones. The heaters 76 for each of the zones requiring heat will be energized for the respective time intervals determined by the controller 18 so that the temperature at each zone is increased the required amount to reach the desired temperature. If, on the other hand, cooling is required by one or more of the zones, the temperature control 20 will respond to the positive control signal from the controller 18 and a series of valves 78 will be energized so as to connect a water supply 80 to the appropriate coolers 82. This series of coolers 82 are also spaced lengthwise along the chamber 30, one for each zone. These coolers 82 utilize the water transferred from the water supply 80 to a sump 84 for the cooling. For the control of temperature along the barrel 30, it is possible that one zone may be heated while another is cooled. Further, it is possible that neither heating nor cooling is taking place in one or more zones at a particular time.

In operation, the profile; i.e., the temperature profile, determined by the temperature set point source 60 should result in the desired temperatures at each zone along the extruder chamber 30 being achieved so that the temperature at the outlet orifice 42 is also that desired. If for different reasons this melt temperature is not achieved, then the controller 18 will make a correction. This is done by a profile changer 86 which is connected to the teletypewriter 50, so as to receive a command melt temperature. This profile changer 86 also receives the temperature of the melt at the orifice 42. This melt temperature is provided by a chamber outlet temperature sensor 88, which also can be a thermocouple. The profile changer 86, if the melt temperature signal is different from the command melt temperature signal, will develop a reset signal which will be supplied to the temperature set point source 60. The source 60 will be reset and provide a different series of temperature set point signals so as to establish a different temperature profile, which will ultimately result in the attainment of the desired melt temperature.

Along with achieving the desired melt temperature at the orifice 42, the pressure of the melt can also be monitored. This is done by a pressure transducer 92 positioned at the orifice 42. If this sensed pressure exceeds a maximum permitted value, the ram velocity set point source 62 is adjusted to override the velocity command and either the ram velocity is reduced to a minimum value or the ram 28 stopped so as to avoid damage.

Various provisions are made for altering the operation of the apparatus 10 in the event of a malfunction, or the approach of an undesired condition. Considering first the condition that occurs when the extrusion material is too cold and it is attempted to turn the ram 28, it will be appreciated that under these conditions either damage to the ram 28 or the drive motor 32 or both will result. For this reason, an appropriate current sensing transducer 94 is incorporated between a power supply 97 and the motor 32. If the foregoing condition exists, the motor current will increase rapidly due to the motor overload and the transducer 94 will provide a corresponding reset signal to the ram velocity set point source 62 and cause a change in the set point. An additional safety feature is included in the form of a cut-off switch 96 which will interrupt the power to the motor 32. If this current sensed by the current sensing transducer 94 becomes excessive, the current sensing transducer 94 will then actuate the cut-off switch 96 and interrupt the power so that the motor 32 will stop and the dangerous condition can thereafter be removed. The cut-off switch 96 can be of any known type that responds to a predetermined maximum current. For example, a current responsive relay could be used or a semiconductor switching device that is biased off by the excessive current.

Considering next a malfunction of one of the coolers 82, if there is a malfunction, customarily there will be a lack of water flow when desired or there is water flow when none is wanted. Therefore, associated with each of the coolers 82 are flow sensors 98 of the type incorporating a current responsive switch which closes when there is a current flow thereto. Conventional flow meters 99 can be used to provide a current for operating the flow sensors 98 when there is a fluid flow. If the flow is not wanted, the closing of the switch because of the undesired flow will cause a fault lamp 100 to be energized and advise the operator of a malfunction. If flow is desired and there is none, the flow sensor 98 sensing the lack of flow will respond to the cooling control signal from the heat or cool device 68 which signal can, in the same way as the flow meters 99, cause the switch function so that the fault lamp 100 again turns on.

If one of the heaters 76 malfunctions, a heater current sensor 102 will become operative. To do this, the heater current sensors 102 each sense the current flow from the power source 74 to its associated heater 76. In the same way as the flow sensors 98, this current or that from the heat or cool device 68 can be employed to actuate a switch in the heater current sensor 102 and cause a fault lamp 104 to be illuminated. If there was no current and current is wanted, the heater control signal will close the switch and cause the energization of the fault lamp 104. On the other hand, if current is provided when not wanted, there will be a current flow, and this current flow will close the heater current sensor switch and cause the energization of the corresponding fault lamp 104.

If desired, instead of warning lamps, some other type alarm can be employed, for example, an audio alarm such as a buzzer can be used.

The command device 16 can render operative the run control mode 58, the idle control mode 54, or the halt control mode 56 to initiate respectively the run, idle or halt mode. Either two of these modes can be commanded in the third with a smooth transition being made in operation and the one to be initiated.

The purpose of the run mode is to change, from any other operating mode, the apparatus 10 so that the ram 28 is turning at its commanded speed and the melt temperature at its commanded melt temperature. The purpose of the idle mode is to change, from any other operating mode, the apparatus 10 so that the ram 28 stopped and the zone temperatures are at safe intermediate temperatures between the room temperatures and the forming temperatures. The purpose of the halt mode is to change, from any other operating mode, the apparatus 10 to the condition of the ram 28 stopped and zone temperatures at room temperatures. It should be noted that it is not necessary for the conditions of one mode to be met before initiating another mode.

If the ram 28 is stopped and any of the zone temperatures are below its respective soak temperature (basically the zone temperatures of the idle mode) and either the run or idle mode is initiated respectively by the run mode control 58 or the idle mode control 54 from the command device 16, the start mode will first be commenced in the initiated mode. The start mode cannot be initiated from the command device 16, but is automatically entered by the run mode control 58 or the idle mode control 54 when the above two conditions are met.

The purpose of the start mode is to bring the zone temperatures to their soak temperatures and maintain the soak temperature profile for a predetermined number of good or accepted counts. A count represents a fixed period of time at which each temperature is observed. A good or acceptable count is one in which all the zone temperature values are within a predetermined limit about their soak temperatures. Consequently, given the possibility of bad or unacceptable counts, the soak period has a minimum but unfixed time duration.

When the soak period expires, the mode, idle or run, most recently initiated from the command device 16 will be entered. If the halt mode was initiated from the command device 16 while the start mode was operative, the halt mode would be immediately operative with no reference to the soak period.

Figure 2:
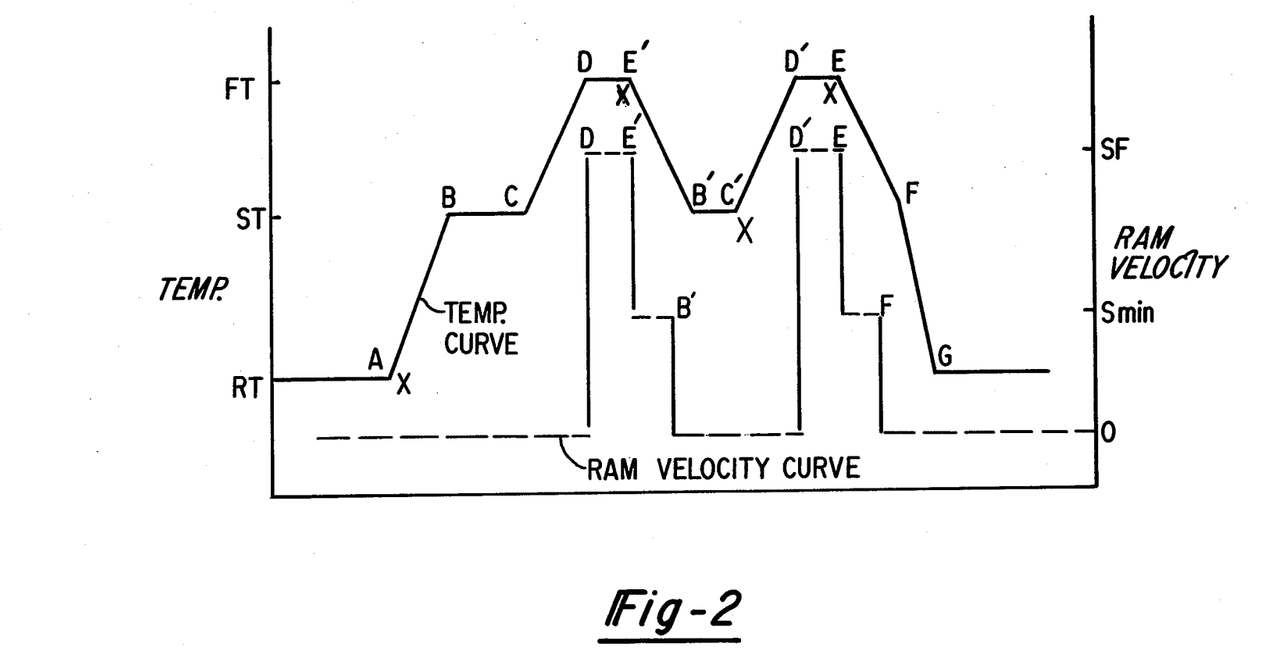
FIG. 2 is a diagram of temperatures and velocities occurring during a cycle of operation of the extruder apparatus.

As an example of an operating sequence, reference is made to FIG. 2 which depicts a ram velocity curve and a temperature curve for a possible typical operating sequence. The temperature curve could represent any of the zone temperatures or the melt temperature.

The sequence from point A to point C will result from either the idle mode control 54 or the run mode control 58 being enabled by the command device 16. Since the temperature is below the soak temperature, the start mode is automatically initiated and the temperature set point source 60 will develop and supply the corresponding temperature set point signals to the temperature comparator 64. An error signal will then be developed corresponding to any difference between the temperature set point signal and the actual sensed value obtained from the temperature sensors 12. Since the extrusion material is at room temperature (RT) at point A, the error signal will cause the heat or cool device 68 to develop a corresponding heat control signal which will render the relays 72 operative to supply current to the heaters 76. The extrusion material will be heated by the heaters 76 to the soak temperature (ST). Consequently, the temperature of the zones will move from point A on the temperature curve to point B and then be maintained at this temperature for the period B-C. When this period has elapsed, the start mode will have been completed and either the idle mode control 54 or the run mode control 58 will take over the control depending on which mode has been commanded. During this time, the ram 28 will be stationary as shown along the broken line part of the indicated ram velocity curve.

Assuming that the command device 16 has requested the idle mode at point A. At point C the idle mode control 54 would be actuated and supply command signals both to the temperature set point source 60 and to the ram velocity set point source 62. The result of activating the idle mode control 54 will be to maintain the temperatures at their soak values with the ram 28 stopped.

However, if at point A, the command device 16 requests the run mode, the run mode control 58 will be accordingly actuated and supply command signals both to the temperature set point source 60 and to the ram velocity set point source 62. The temperature set points will require a temperature increase to obtain the desired temperatures for starting the ram 28. Hence, the heater 76 will heat the extrusion material along the temperature curve from C to D and the forming temperature (FT).

Once each zone along the extruder barrel 30 is at the proper temperature, the ram 28 will be started, and the ram velocity will increase rather rapidly as shown by the ram velocity curve or be increased in a stepwise fashion.

Now the apparatus 10 will operate at this temperature with the temperature control 20 providing either heating or cooling to maintain the desired set point temperatures and accordingly the required profile represented by the different zone temperatures. If the melt temperature is not that desired at the chamber orifice 42, the profile changer 86 will change the set points and the temperature profile so that the appropriate correction can be made. Also, the velocity of the ram 28 is maintained constant and shown by the curve between points D and E (forming velocity, SF).

If it is desired to go from the run mode to the idle mode, the corresponding command can be given and the idle mode control 54 rendered operative to provide the proper commands to the temperature set point source 60 and the ram velocity set point source 62 so that appropriate set point signals will be developed for reducing the temperature from the forming temperature at E' to the soak temperature B' on the temperature curve in FIG. 2. The ram velocity will be decreased from E' to B' on the ram velocity curve. At B', the ram 28 is stopped.

Subsequently, the run mode or the halt mode can be initiated from the idle mode. If the run mode is commanded, the temperature profile will increase from the point C' on the temperature curve to D' which corresponds to the temperature at which the ram 28 can be started and, of course, the ram velocity will be increased to D' along the ram velocity curve. Again, at point E on the temperature curve, the halt mode or the idle mode can be requested.

If now the operator desires to initiate the halt mode, the command device 16 will provide the appropriate command signals to the halt mode control 56. The corresponding set points will be provided by the temperature set point source 60 and the ram velocity set point source 62 so that the temperature profile will decrease along the temperature curve from points E to G and to room temperature while the ram velocity will decrease from the point E to F and then be stopped. The coolers 82 will, of course, be operative during this decrease of the temperature and the motor 32 will continuously decrease its output so that the ram 28 speed is nulled.

During the operation discussed, all the controlled and several additional process variables are monitored for safe operation. Most safety functions are the lighting of lamps or some other indicator. However, in the case of ram speed, motor current and particularly pressure, the controller 18 will take action such as slowing or stopping the ram 28 should either of these three variables take on unsafe values.

Figure 3:
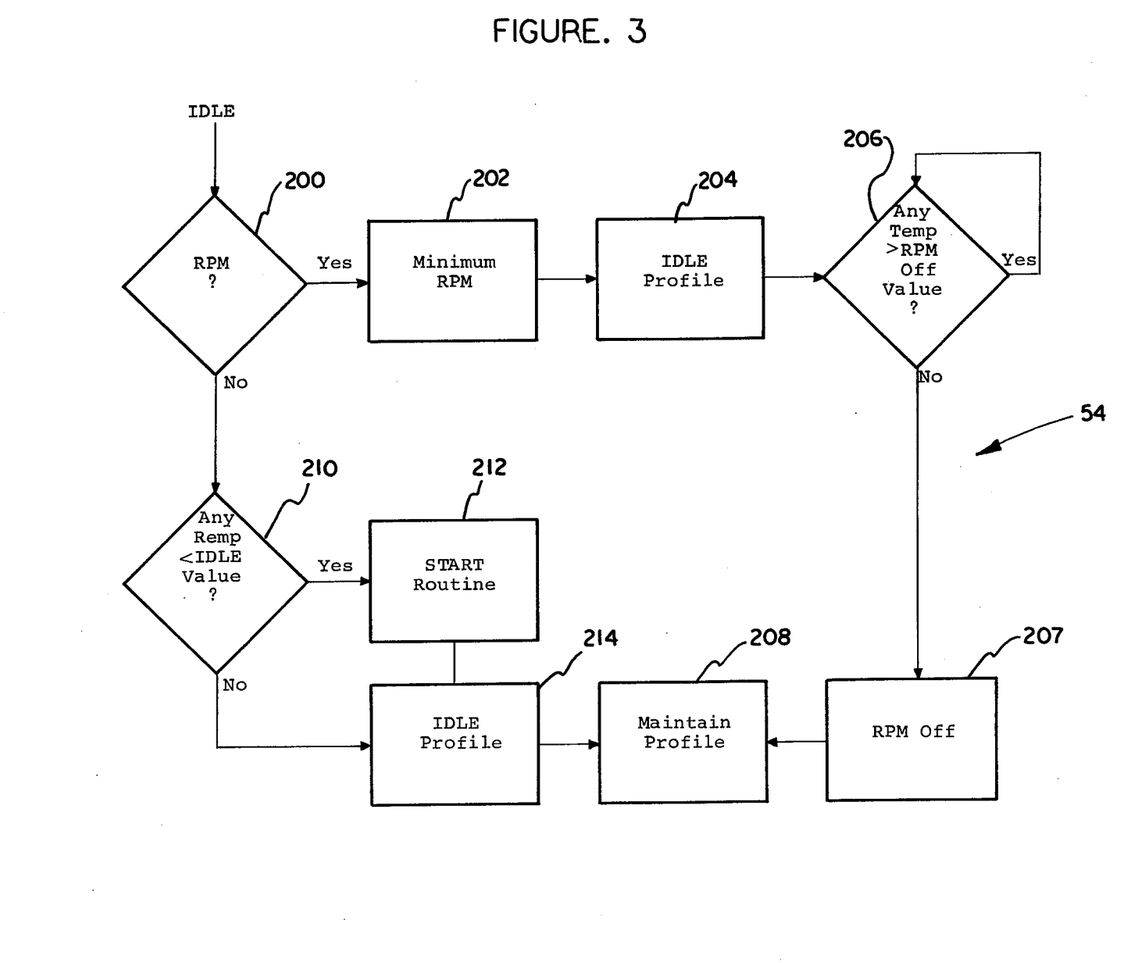
FIG. 3 is a logic diagram for the idle mode control.
Figure 4:
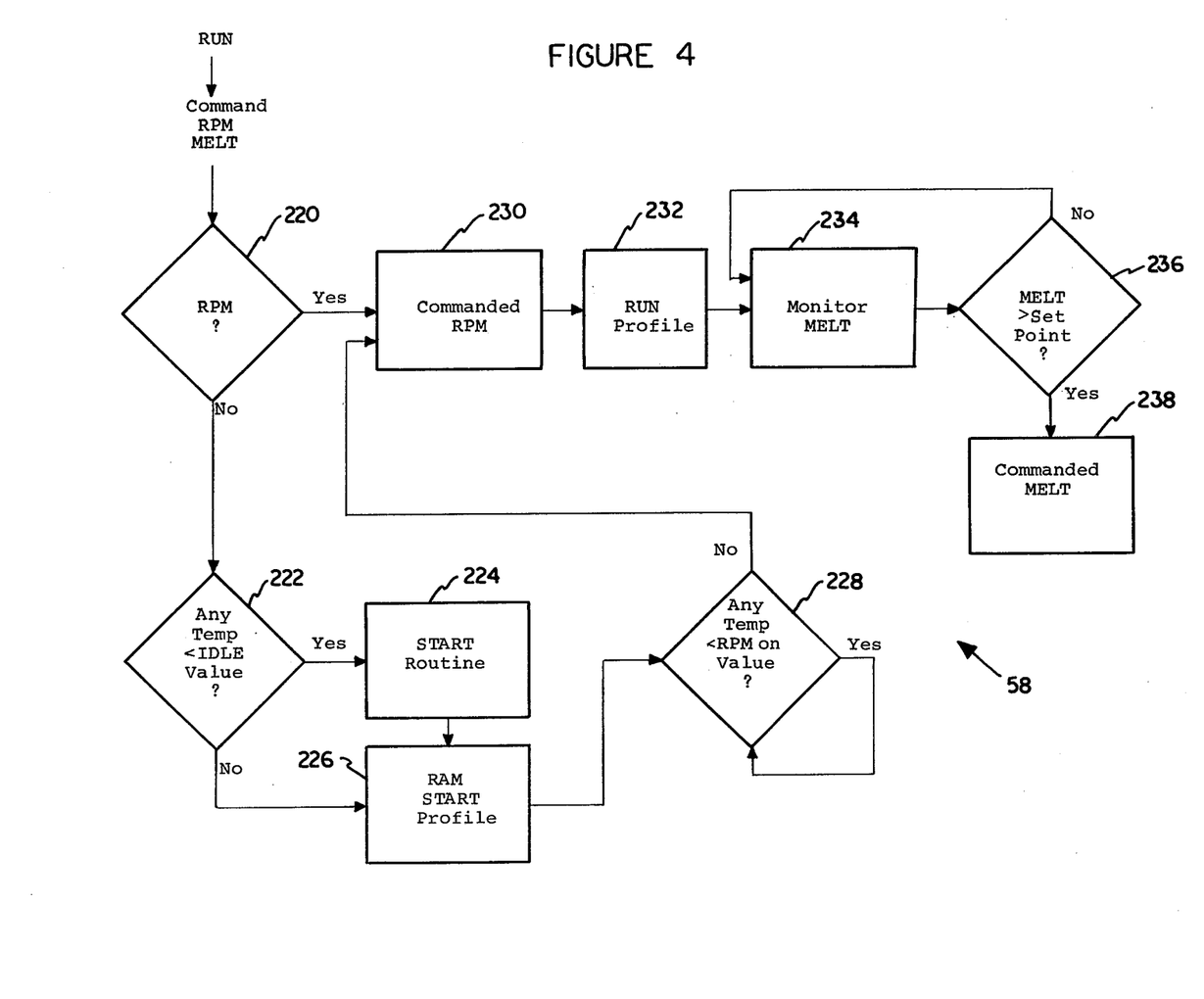
FIG. 4 is a logic diagram for the run mode control.
Figure 5:
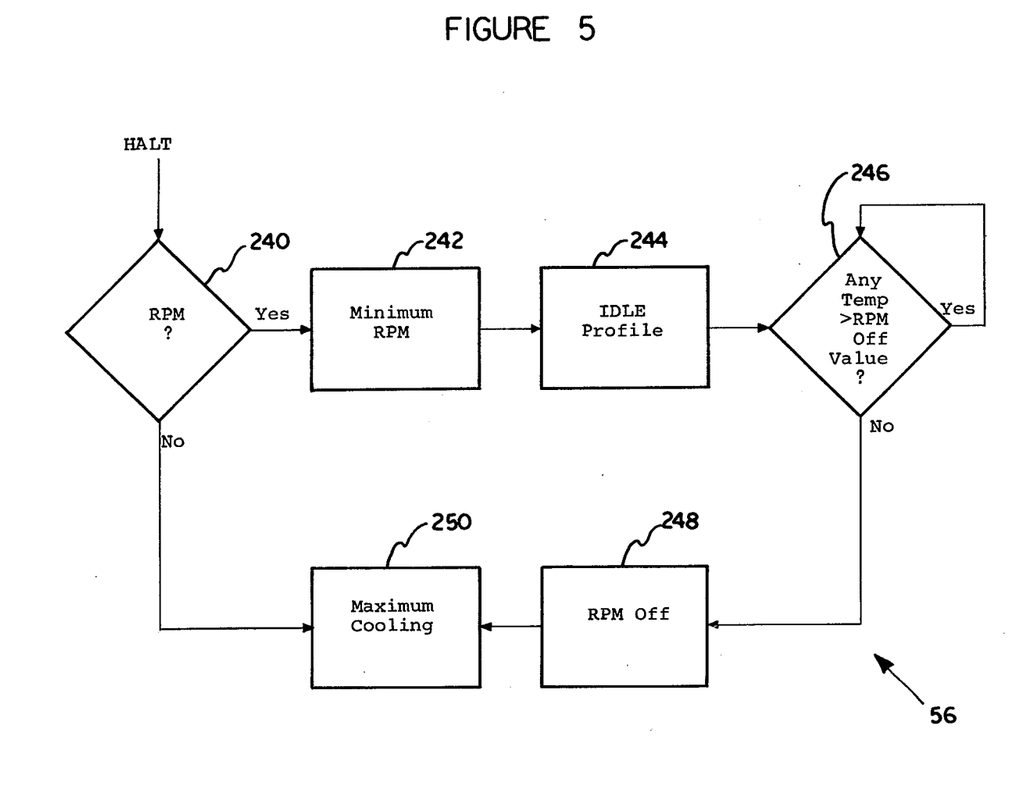
FIG. 5 is a logic diagram for the halt mode control.

In a preferred embodiment, the controller 18 may be a PDP family-of-eight computer, manufactured by the Digital Equipment Corporation. FIGS. 3, 4 and 5 are designed to illustrate the logic steps involved in carrying out the control scheme in the idle mode control 54, the halt mode control 56 and the run mode control 58.

With particular reference to FIG. 3, the logic flow chart for the idle mode control 54 is shown. As an input, the command to assume the idle mode is applied through the command device 16. In step 200, an initial determination is made as to whether or not the extruder ram 28 is turning. If the ram 28 is turning, step 202 commands the ram 28 to assume a minimum revolution value. Next, step 204 sets up an idle temperature profile which the temperature control unit 20 will cause the extruder 10 to assume along the length of its barrel. In a specific example, the idle profile for a material such as polyvinyl chloride is a temperature of 200° in each of the zones of control along the length of the extruder 10. Thus, the temperatures along the length of the barrel of the extruder 10 will be tending toward an even temperature of approximately 200° F. The idle profile remains in command, but control also passes to step 206, in which the determination of the temperature is continuously made for the purposes of determining whether or not any temperature along the length of the barrel of the extruder 10 is greater than the temperature at which the ram 28 may be safely turned off. So long as this temperature has not yet been reached, the step 206 will remain in control of the ram 28. Once this temperature has been reached for all of the zones of control, the system next progresses to stop 207, which then turns the extruder ram 28 off. Finally, step 208 commands the temperature controller 20 to maintain the idle profile until instructed otherwise. Assuming, on the other hand, that at step 200 the ram 28 was not turning, the next step to be considered would be step 210 rather than step 202. In step 210, a determination is made of all of the temperatures in the control zones, and if any temperature is less than the idle temperature value, a step 212 is entered, which is the start routine or start temperature profile. As previously explained, the start routine or start profile is internal of the controller 18, and may not be directly commanded. It is basically an event counter and is designed to ensure that all of the zones of temperature control are being properly controlled before operating authority is given over to one of the other commandable operating modes. The start profile ensures that the proper number of counts of a specific temperature have been obtained before control is transferred. A count is a specified length of time, and thus the start profile acts as a timer.

As an example of a temperature profile for the start profile, the temperatures of the zones may be 175° F., 200° F., 225° F., and 215° F., in sequence from the feed end to the die end. This temperature profile is by way of an example for operating polyvinyl chloride. Once the start mode has been satisfied, control is transferred to step 214 which once again sets up the idle profile which may be identical to that set up in step 204. Going back for a moment to step 210, had the answer to the inquiry to all of the temperature control zones been "no," there is no temperature that is less than the idle temperature values," control would have passed directly to step 214. Finally, step 214 then interfaces with step 208, and the idle profile is maintained, again until another one of the operational modes is called for. It is important to realize that the idle temperature profile is a temperature at which a plastic material may be held for an indefinite period of time without serious degradation of the material. It is thus a function of the properties of the material itself and must be determined for each material which is to be operated in the extruder apparatus 10. Therefore, the specific temperature examples given should be kept in mind as only examples for a material such as polyvinyl chloride.

FIG. 4 illustrates the logic flow for the run mode control 58. When the command device commands the run mode 58, not only should the command to be in the run mode be given, but also a particular commanded velocity for the ram 28 and a particular desired melt temperature should also be given. If these two last factors are not given when the command to run is given, the run mode control 58 will take as values for these quantities the last previous values which are used. Initially, step 220 considers whether or not the ram 28 is turning at the time the command to run is given. If the answer to this question is "no," step 222 is entered, in which the temperatures of the various zones of control are measured. In this case, if any temperature is less than the idle temperature value, step 224 is entered, which is the "start" routine. This "start" routine or "start" mode may be identical to the "start" mode described with respect to step 212. If the answer to the temperature inquiry in step 222 is "no," the run profile is entered directly in step 226. Step 226 is also entered from step 224, once the proper temperature values have been established. Step 226 is designed to set the temperature controller 20 such that the temperatures of the various zones of control will be moved to those necessary for operational values. Step 226 is designated as a "ram start" profile, which is a specific series of temperatures along the zones of control of the extruder 10 which are necessary for a particular thermoplastic material being operated in the extruder 10. For example, using polyvinyl chloride material in a 2 ½ inch diameter extruder 10, the temperatures in the zones, moving from the feed end toward the die end, are 300° F., 325° F., 345° F. and 335° F. From step 226, the control proceeds to step 228, in which a check is made of the various temperatures at that point to determine if any temperature is less than the temperature at which the ram 28 may be turned on. If the temperature is less than the safe temperature at which the ram 28 may be turned on, step 228 is maintained until such time as all of the temperatures are proper for the ram 28 to be turned on. Control then proceeds from step 228 to step 230, at which point the ram 28 is brought up to the commanded speed of operation. Note that step 230 is entered directly from step 220 if the initial determination in step 220 is that the ram 228 is already operating. Step 232, having been entered from step 230, will bring the temperatures along the length of the barrel of the extruder 10 to the "run" profile. That is, the temperatures along the length of the barrel of the extruder 10 are maintained at the preset run temperature levels of 250° F., 275° F., 295° F., and 285° F. from the feed end toward the die end for polyvinyl chloride. From step 232, step 234 then monitors the melt temperature. This is the temperature of the eventual product of the extruder 10. From step 234, step 236 then makes the determination whether or not the melt temperature is greater than the set point of the melt temperature. If not, step 234 continues to monitor the melt temperature and ensure that it remains constant. If the melt temperature is greater than the commanded melt temperature or the set point of the melt temperature, step 238 is entered from step 236, and the proper commanded melt temperature is obtained by automatically adjusting the zone temperature set points by means of the profile changer 86.

FIG. 5 illustrates the logic flow chart for the "halt" mode control 56. In this case, "halt" is commanded from the command device 16. Step 240 first determines whether or not the ram 28 is turning. If the ram 28 is turning, step 242 is entered from step 240, and the ram 28 is set at a minimum velocity. Next, from step 242, step 244 is entered which sets the temperature values at the idle temperature profile. This idle temperature profile set by step 244 is identical to the idle temperature profile in steps 214 and steps 204. This profile is chosen since it will allow the ram 28 to continue turning without causing any damage while still bringing the temperatures of the various zones down in a controlled fashion to a particular desired level. From step 244, step 246 then makes the decision whether or not any temperature along the length of the barrel of the extruder 10 is greater than the temperature at which the ram 28 may be safely turned off. So long as this temperature is above the value at which the ram 28 may be turned off, step 246 maintains control. Once the temperature values have fallen below the safe ram "off" temperature levels, step 248 is entered which turns off the ram 28. Then, step 250 is entered, which is a maximum cooling step which cools the extruder 10 down to room temperature. If, in step 240, it had been determined that the ram 28 was not rotating, step 250 would have been entered directly, and maximum cooling would have begun at that point.

The embodiments of the invention in which an exclusive property or privilege is claimed are defined as follows:

1. In an improved method of controlling an extrusion apparatus of the type having an extruder chamber and a movable extruder ram mounted in said extruder chamber for moving extrusion material through a series of zones extending along the extrusion chamber and out an extrusion chamber outlet, the improvement comprising:
   sensing the temperature of the extrusion material in each of the series of zones along the extrusion chamber;
   generating a series of temperature signal quantities each corresponding to the temperature of one of said series of zones;
   sensing a rotational velocity of said extruder ram;
   generating a rotational velocity signal quantity corresponding to the rotational movement of said extruder ram;

generating as electrical signal quantities mode operating command signal quantities, each corresponding to a selected one of plural operating modes;

generating as an electrical signal quantity a rotational velocity command signal quantity corresponding to a desired rotational velocity of said extruder ram;

selecting one of said plural operating modes;

electronically developing a series of temperature set point signal quantities for the selected operating mode such that each temperature set point signal quantity corresponds to a desired temperature for a respective zone of said series of zones;

electronically developing a rotational velocity set point signal quantity corresponding to the desired rotational velocity of said extruder ram for the selected operating mode;

electronically comparing the series of temperature set point signal quantities with the series of sensed temperature signal quantities;

electronically generating a series of temperature error signal quantities corresponding to the variation between the set point temperature and the sensed temperature for each of the series of zones and presenting said temperature error signal quantities as an output from said controller;

electronically comparing the rotational velocity set point signal quantity with the sensed rotational velocity signal quantity;

electronically generating a rotational velocity error signal quantity corresponding to the difference between the rotational velocity set point and the sensed rotational velocity and presenting said rotational velocity error signal quantity as an output from said controller;

adjusting the temperature of said series of zones to correspond to said set point temperatures in response to said temperature error signal quantities; and adjusting the rotational velocity of said extruder ram to correspond to said rotational velocity set point in response to said rotational velocity error signal quantity.

2. The method of claim 1 which further includes the steps of:

sensing the pressure of the extrusion material at the chamber outlet;

generating a corresponding pressure signal quantity representative of said pressure; and controlling said ram velocity set point in response to said pressure signal quantity to avoid exceeding a preselected maximum pressure value.

* * * * *